United States Patent [19]
Kaspar

[11] 4,262,049
[45] Apr. 14, 1981

[54] FORAMINOUS ELASTOMERIC SHEET MATERIAL

[75] Inventor: Peter D. Kaspar, Dover, Del.

[73] Assignee: International Playtex, Inc., Stamford, Conn.

[21] Appl. No.: 822,107

[22] Filed: Aug. 5, 1977

Related U.S. Application Data

[60] Continuation of Ser. No. 122,972, Mar. 10, 1971, abandoned, which is a division of Ser. No. 796,536, Feb. 4, 1969, Pat. No. 3,605,191, which is a continuation-in-part of Ser. No. 704,783, Feb. 12, 1968, abandoned.

[51] Int. Cl.$^2$ .......................... B32B 3/10; D06N 7/04
[52] U.S. Cl. .................................. 428/131; 156/250; 264/154; 428/137; 428/156
[58] Field of Search ............... 156/250, 253; 264/154, 264/155, 156; 428/131, 137, 156, 159, 160

[56] References Cited

U.S. PATENT DOCUMENTS

| | | | |
|---|---|---|---|
| 1,862,633 | 6/1932 | Ramsay | 156/253 |
| 2,115,122 | 4/1938 | Prudden | 128/156 |
| 2,275,425 | 3/1942 | Graber | 428/138 |
| 3,012,918 | 12/1961 | Schaar | 264/156 |
| 3,079,643 | 3/1963 | Miller et al. | 264/305 |
| 3,253,598 | 5/1966 | Spanel | 428/137 |
| 3,386,876 | 6/1968 | Wyckoff | 428/134 |
| 3,387,077 | 6/1968 | Sammons et al. | 264/289 |
| 3,482,567 | 12/1969 | Franklin | 428/255 |
| 3,489,154 | 1/1970 | Kaspar et al. | 428/131 |
| 3,632,716 | 1/1972 | Fairbanks | 264/145 |

*Primary Examiner*—James J. Bell
*Attorney, Agent, or Firm*—Stewart J. Fried; Jeffrey A. Schwab

[57] ABSTRACT

A deposited sheet of foraminous material (e.g., elastomeric material such as a latex) having a lace-like configuration repeated over the extent of the sheet. This configuration includes relatively open mesh regions, and relatively closed solid petal regions. Portions of the configuration have a substantial plurality of perforated openings per unit area, with the open regions having a greater area of such openings per unit surface area than in the closed regions. At least some of the closed petal regions have a predetermined lesser thickness than the open mesh regions such that the lesser thickness closed regions have a greater surface of elastomeric material per unit area than in the open regions without having a corresponding greater amount of elastomeric material per unit area. Some of the openings bordering said closed regions may be of reduced cross section. Apparatus and method for manufacturing such a sheet are also described.

7 Claims, 32 Drawing Figures

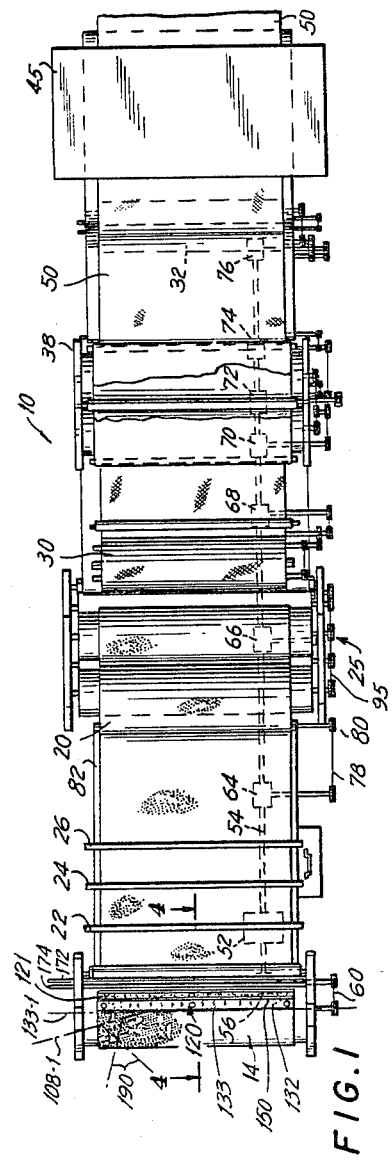
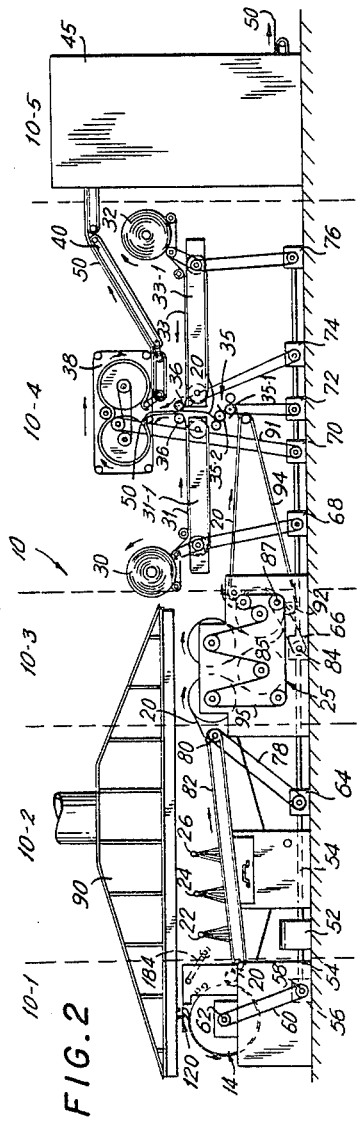
FIG.1
FIG.2

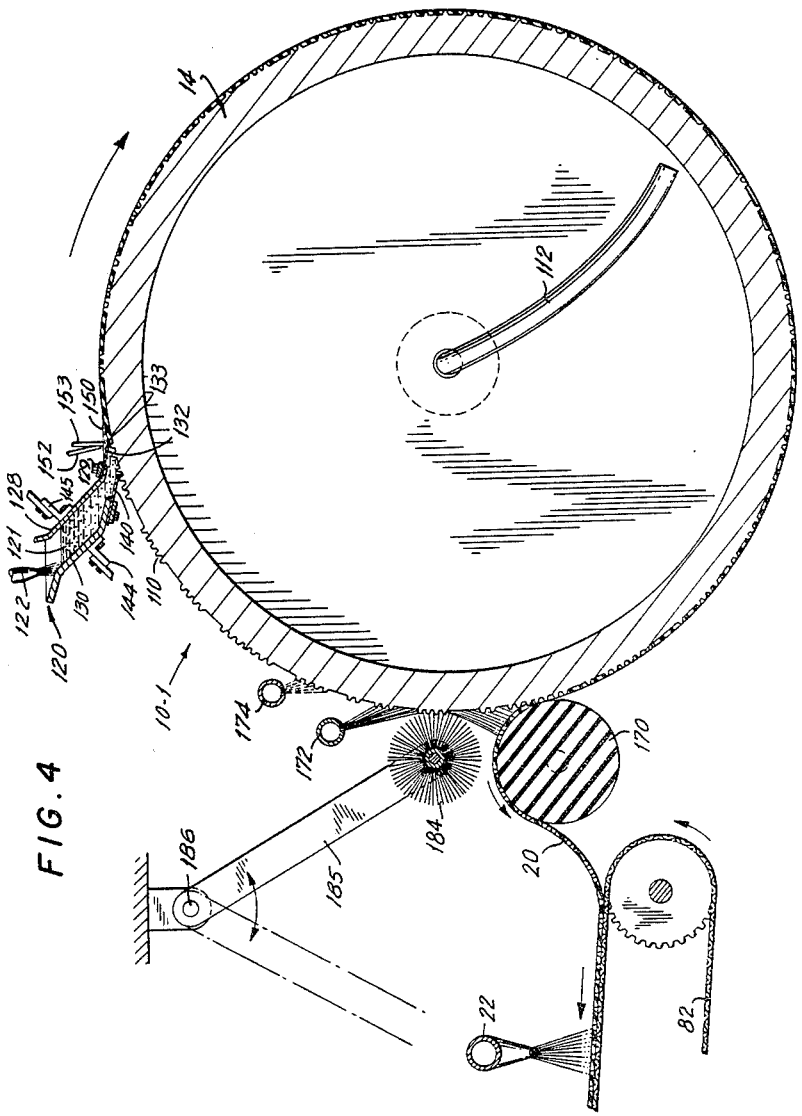

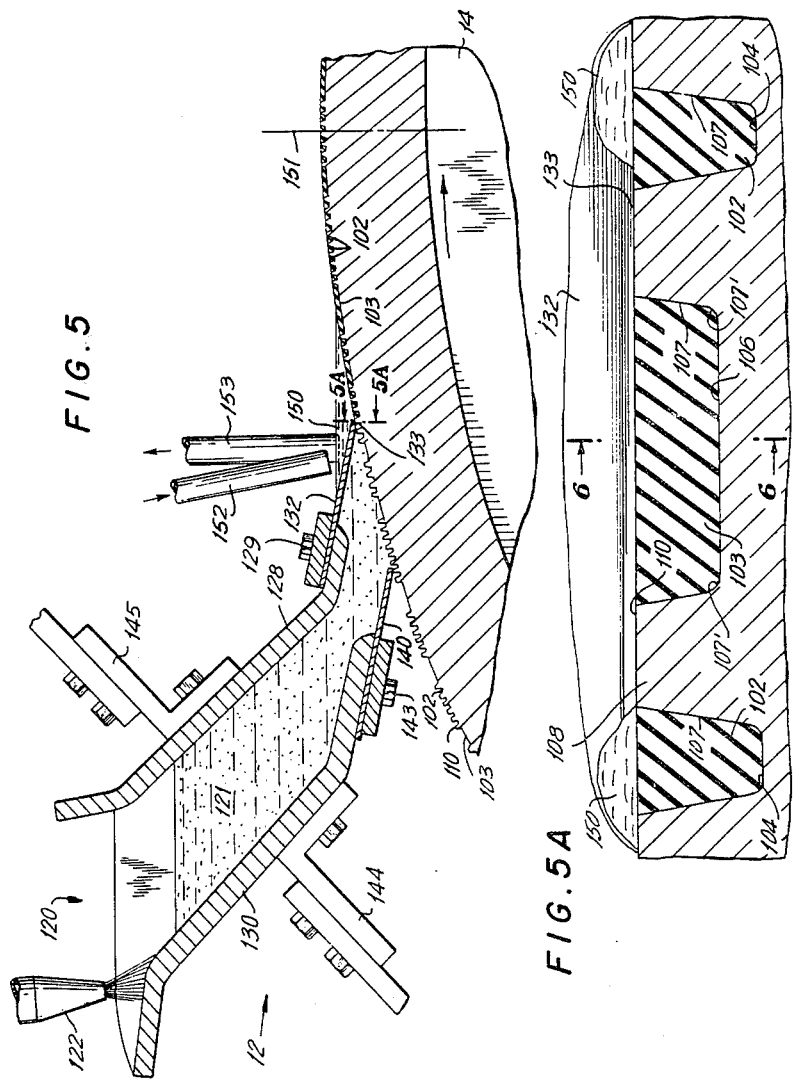

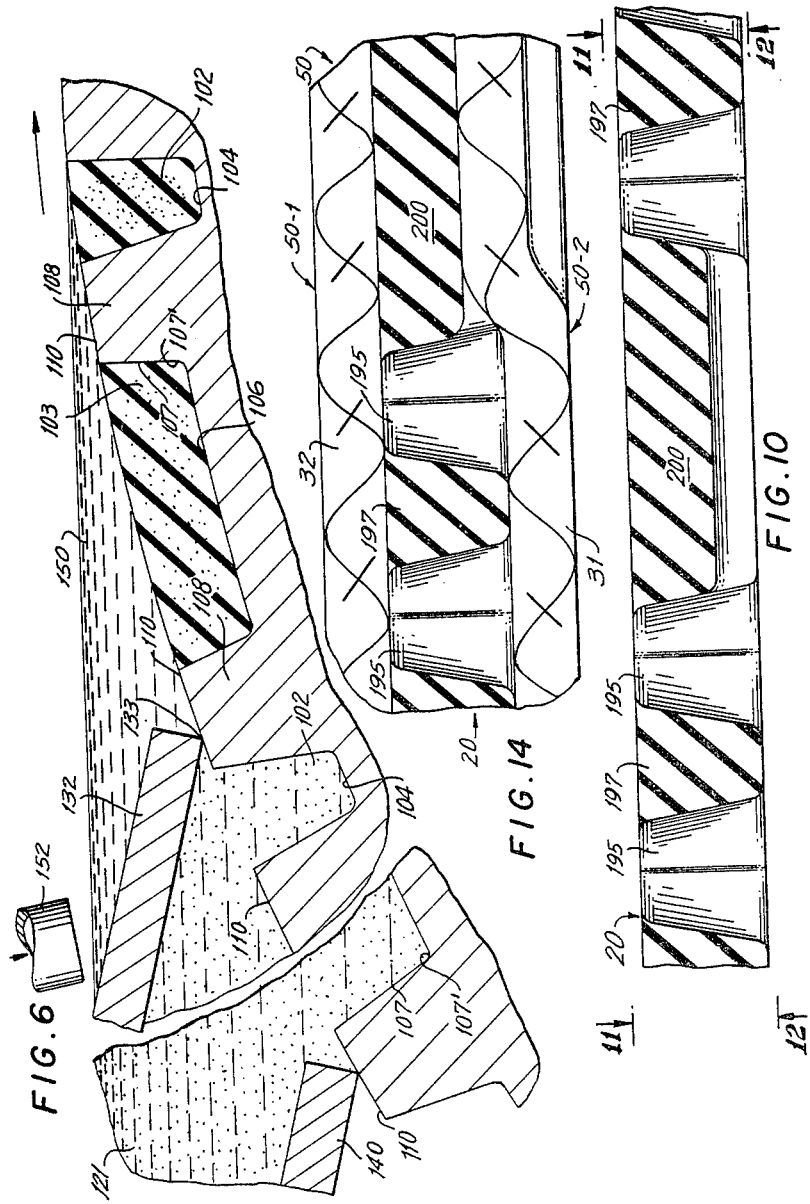

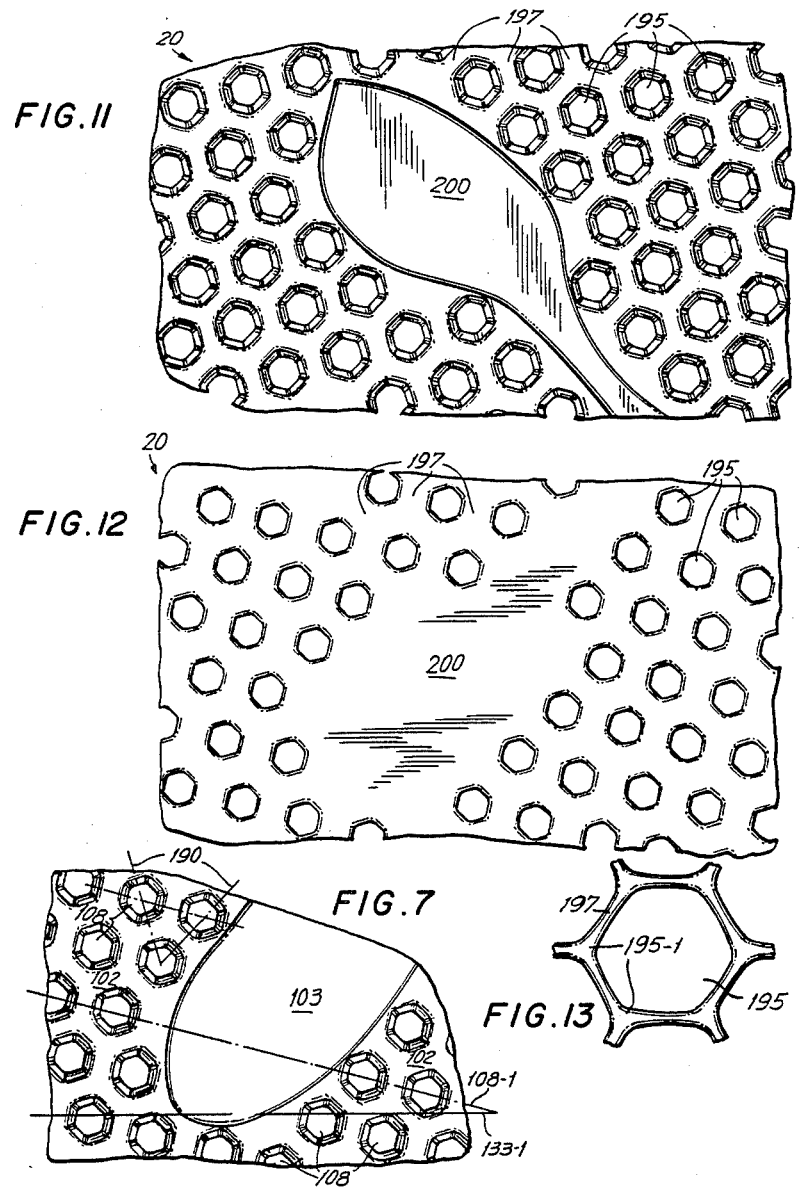

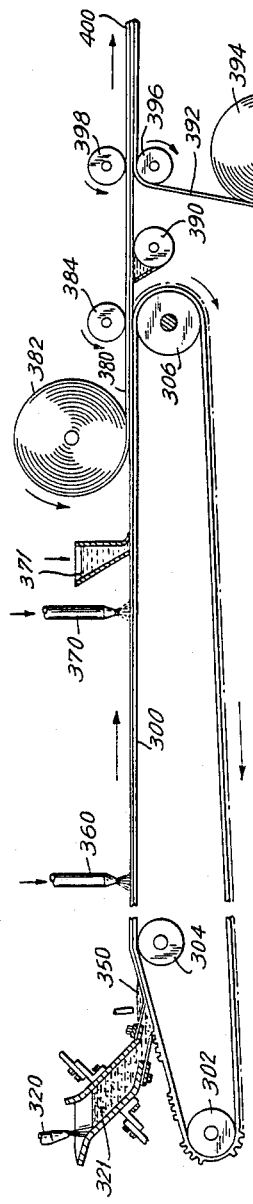
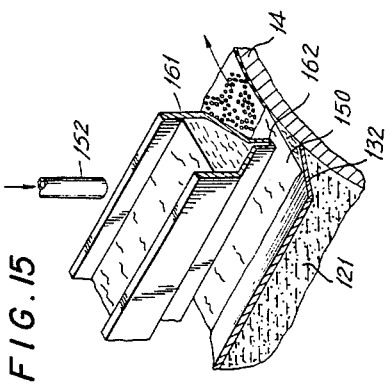
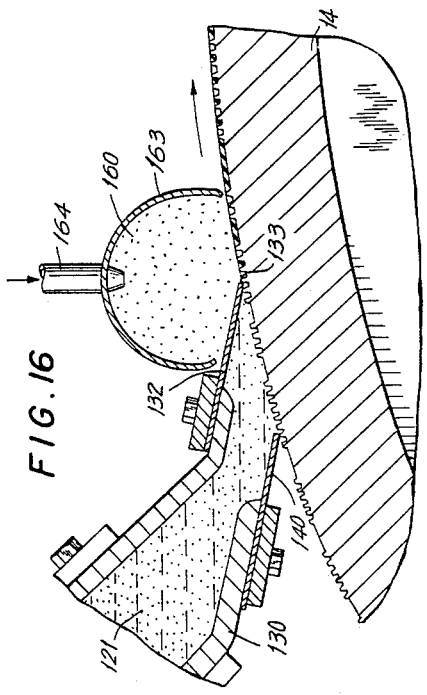
FIG.30
FIG.15
FIG.16

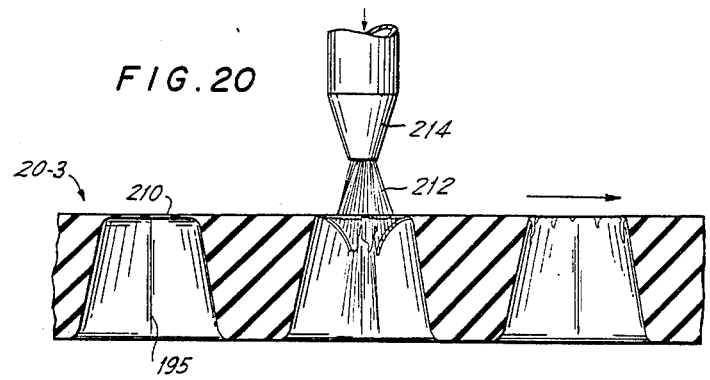
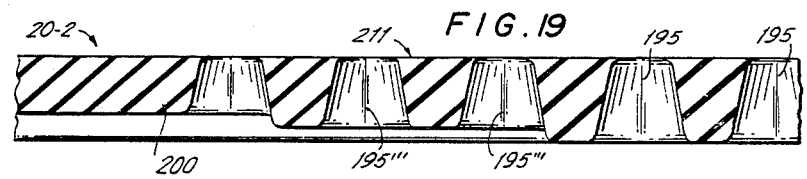

FORAMINOUS ELASTOMERIC SHEET MATERIAL

This is a continuation of application Ser. No. 122,972, filed Mar. 10, 1971, now abandoned, which is a division of Ser. No. 796,536, filed Feb. 4, 1969, now issued as U.S. Pat No. 3,605,191, which in turn was a continuation-in-part of Ser. No. 704,783, filed Feb. 12, 1968, and now abandoned.

This invention relates to the improved foraminous sheet material which can be fabricated, by the apparatus of my parent application, now U.S. Pat. No. 3,605,191. The invention particularly lends itself to such foramenous sheet material which is foraminous, and may be laminated to stretch-fabric outer layers. For a detailed discussion of the typical characteristics and applications of such laminated material, reference is made to co-pending U.S. patent application Ser. No. 706,066, filed Feb. 16, 1968 in the name of myself and Paul Ambrose, and entitled "Composite Sheet Material and Articles Made Therefrom" in favor of Ser. No. 820,044, filed Apr. 8, 1969 and now issued as U.S. Pat No. 3,489,154.

The foraminous sheet material of the present invention is typically formed of a latex, which after coagulation and processing provides an elastomeric sheet. Other coagulable liquids may also be employed, and where desired, the resultant sheet material may have lesser or greater elastomeric qualities than the products resulting from the particular details of the herein disclosed embodiments. Thus, while the ensuing discussion will principally be directed towards foraminous latex sheet material, this is done primarily to avoid any undue prolixity. The term "latex" is not limited to rubber latex, but is inclusive of vinyl latex as well as other suitable colloidal dispersions. With this in mind it should be understood that the foregoing use of the term "latex" is primarily for convenience of reference, and is not limited to the particular compounds disclosed herein.

It has heretofore been known how to fabricate continuous foraminous latex sheet material by the successive spray depostion of liquid latex on an open mesh-type forming conveyor. Typically, where it is desired that the foraminous sheet material be lace-like in appearance, the forming conveyor consists of a continuous belt of suitably treated configurated material. A practical fabrication technique in accordance with this arrangement is shown in my co-pending U.S. patent application Ser. No. 705,210, filed Feb. 13, 1968 and entitled "Method of an Apparatus for Forming Foraminous Material and Composite Material" and now U.S. Pat. No. 3,615,962. For practical reasons, spraying requires that the film be built up gradually. It should thus be appreciated that this tends to limit the production output. It has also been determined that although the fabrication technique of my afore-mentioned U.S. Pat. No. 3,615,962, does have a high degree of practicality, the production costs are also increased by the considerable unrecoverable loss of sprayed material. Also, the entire film will be of the same thickness.

It has also been observed that the stripping of the sheet material off the belt may cause minute surface fissures on the foraminous sheet material. Such fissures could in time create somewhat weakened areas within this foraminous sheet material, and after prolonged use they could initiate ruptures in the material. While such possible weakened areas do not negate the practical usefulness of the product, I have determined that the elimination of these minute surface fissures could further enhance the resultant product.

Other techniques previously utilized for obtaining foraminous sheet material have included perforating a solid sheet, such as calendered stock. However, such perforations are substantially limited as to number per unit area, and the puncturing of the sheet has a tendency to cause ragged edges, giving rise to tearing and accelerated deterioration in use.

The present invention avoids the above problems of the prior art, and provides an improved product. As disclosed in my U.S. Pat. No. 3,605,191, I have found that foraminous latex sheet material may be formed by depositing a layer of latex on a relatively movable forming surface, such as the face of a rotating cylinder. The forming surface has a solid base means (as contrasted to the belt discussed in conjunction with U.S. Pat. No. 3,615,962 with a spaced plurality of projections extending therefrom. The liquid latex is applied to the relatively movable forming surface by unique depositing blade having a spreading means at its terminus. The forming surface projections provide the locations for hole openings in the sheet material. As the deposited latex layer emerges from under the spreading blade, an active surface coagulant is immediately applied to the latex. The surface coagulant may be a liquid which serves to prevent the formation of a coagulated film over the tops of the projections. Thus, smooth well defined openings are provided at each of the projection locations. The forming surface may, for example, have a lace-like pattern configuration formed therein. Such a lace-like configuration has been found to have considerable consumer appeal when utilized for body undergarments such as girdles. It should, however, be understood that the use of a lace-like configuration on the forming surface is only exemplary.

When a lace-like configuration is used there will be relatively closed regions of the elastomeric sheet which include a greater surface of latex per unit area than at other regions which are relatively open or mesh-like (e.g. the petals of the lace configuration may be at such relatively closed regions). When such a sheet is subjected to an elongation stress, The relatively open regions offer less resistance to stretch; and therefore, will tend to stretch more than the relatively closed regions. This distorts the configuration, and by influencing the stretch at the relatively open regions weakens the sheet. In order to minimize this difference of stretch, I may provide for a lesser thickness of elastomer at such relatively closed regions. Also, since those portions of the mesh-like open regions which border the relatively closed regions may be subjected to considerable stretch stresses, I may also provide smaller cross-sectional holes at such bordering regions. Accordingly, I can achieve a more uniform stretch over the entire area of the foraminous sheet material than in the products of the prior art.

In the apparatus for manufacturing the foraminous sheet material of my invention, the the liquid latex is deposited on the forming surface from a trough which forms a reservoir for the latex. The trough has an exit constituting mouth for controlling the deposition of the latex onto the forming surface; the feeding bottom comprising a moving portion of the forming surface adjacent thereto. The forming surface is shown provided about a cylinder, or along an endless conveyor. In either arrangement, the trough feeding mouth is located in juxtaposition to a realtively small portion of the forming surface. Relative movements is provided between the trough and the forming surface, (by rotating the cylinder or moving the conveyor belt, or by moving the trough), so that successively adjacent portions of the forming surfaces face the reservoir bottom. The latex liquid in the reservoir is sequentially deposited onto successively adjacent portions of the forming surface. The terminus of the reservoir opening includes the spreading means, which overlies the liquid latex just emerging from under the feeding bottom. A flexible spreading blade is positioned in contact with the top surfaces of the forming surface projections. The spreading blade is so positioned with respect to the forming surface that a valley is formed. One side of the valley is the blade, and the other the forming surface. An active liquid coagulant forms a pool within this valley. The action of the coagulant serves to coagulate the latex as it emerges from under the blade and prevent its filming over the projection tops. The projection tops have no latex on them, by virtue of their metal-to-metal (for example) contact with blade. This creates a hole at each of the projection locations. It has also been determined that the application of an active coagulant at the blade edge region serves to keep the blade clean, and prevent the build-up of a latex coagulum. I have determined that by a proper combination of the latex and coagulant characteristics, in conjuction with the machine parameters, I can produce foraminous sheet material, without leaving any latex residue on the projections tops. This dispenses with the need to clean the forming surface between the stripping of the sheet material and the subsequent application of another latex deposit.

The product manufactured in accordance with my invention is a substantially faithful reproduction of the forming surface. Since the forming surface may be constructed to facilitate the smooth stripping of the sheet material, the resultant sheet material demonstrates a high degree of uniformity and surface smoothness, thereby providing an end product of enhanced practical utility.

Foraminous sheet material of the present invention demonstrates particular utility when used in conjunction with body constricting garments, such as girdles. Such products are discussed in a forementioned copending U.S. Pat. No. 3,489,154, which discloses a laminated material formed by bonding thin stretch fabric outer layers to the opposite faces of an inner foraminous layer. By utilizing the foraminous sheet material of the present invention as the inner layer, an improved product is obtained capable of demonstrating a more uniform stretch characteristic over its surface, and offering greater resistance to flex-cracking or other degradation. Such a laminated material also has application in conjunction with other garments wherein substantial porosity is required for the wearer's comfort, (e.g. bathing suits and brassieres).

It is therefore seen that a primary object of the present invention is to provide an improved foraminous sheet material.

Another object of the present invention is to provide an improved foraminous sheet material having elastomeric qualities.

A further object of the present invention is to provide a deposited sheet of foraminous material having a desired uniformity of elongation and stretch stresses over its surface.

An additional object of the present invention is to provide such a foraminous sheet of elastomeric latex which may have in certain preselected regions of the sheet material a lesser thickness than in other regions of the sheet material.

Yet an additional object of the present invention is to provide such a foraminous sheet of elastomeric latex which includes substantially open mesh regions and substantially closed regions having a greater surface of latex per unit area, in which the relatively closed regions may be of such a predetermined lesser thickness in order to provide a more uniform distribution of latex per unit area and stretch over the surface.

These as well as other objects of the present invention will become apparent upon a consideration of the following description and drawing in which:

FIG. 1 is a plan view of an apparatus for manufacturing the sheet material of my invention.

FIG. 2 is a side view of the apparatus shown in FIG. 1.

FIG. 4 is a cross-sectional view of the portion of the apparatus for forming the sheet material.

FIG. 5 is an enlarged cross-sectional view of the depositing means shown in FIG. 4, and includes further details thereof.

FIG. 5A is a cross-sectional view along the lines 5A—5A of FIG. 5, and shows the manner in which the flexible spreading blade contacts the forming surface and the coagulable liquid immediately emerging from under the spreading blade, and the application of the surface coagulant at the blade edge region.

FIG. 6 is a further enlargement of a portion of the depositing means along the lines 6—6 of FIG. 5A and particularly directed to the relationship between the spreading blade, deposited liquid and surface coagulant.

FIG. 7 is an enlargement of a portion of the forming surface, in accordance with a particular configuration for fabricating lace-like sheet material.

FIG. 10 is a cross-sectional view of a portion of the foraminous sheet material made on the forming surface of FIG. 9.

FIG. 11 is a top view of the sheet material shown in FIG. 10, as indicated by the arrows 11—11.

FIG. 12 is a bottom view of the sheet material of FIG. 10, as indicated by the arrows 12—12.

FIG. 13 is an enlarged view showing the manner in which the elastomeric sheet material of FIGS. 10-12 typically stretches about one of its openings.

FIG. 14 is a cross-sectional view showing a laminated material having the sheet material of FIGS. 10-12 as its inner layer, and a stretch fabric for each of its outer layers.

FIG. 15 is a simplified perspective view showing a modified arrangement for applying the surface coagulant.

FIG. 16 is still another modification for applying the surface coagulant, in which the surface coagulant is a gaseous vapor, or nebulized spray.

FIG. 19 shows still another modification of the foraminous sheet material capable of production in accordance with a modified forming surface of my invention, which includes a desired graduated variation in the thickness of the material.

FIG 20 represents a modified, but somewhat less advantageous technique for providing openings through the sheet material.

FIG. 30 shows, in simplified form a modification of my invention in which the forming surface is an endless conveyor belt.

Figure 3:
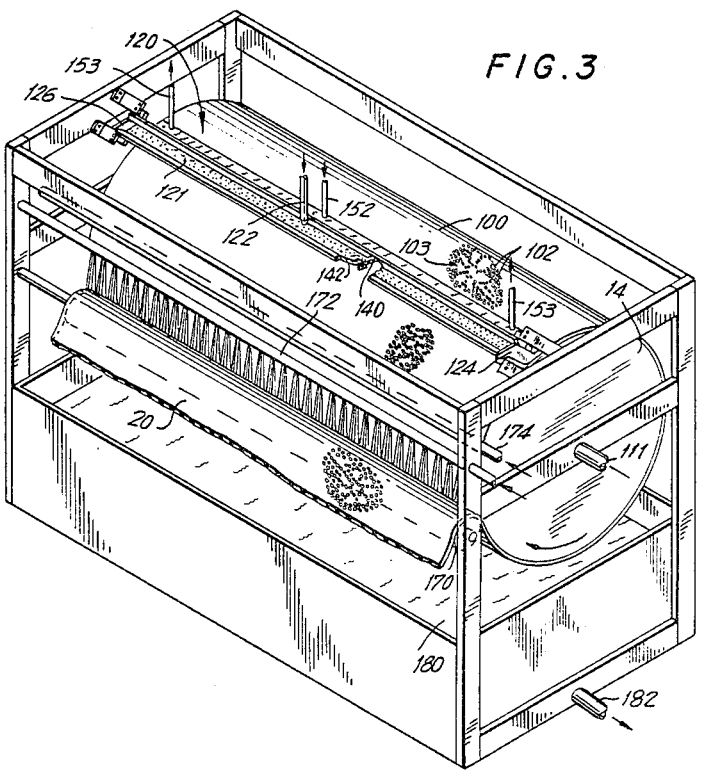
FIG. 3 is a perspective view of a portion of the apparatus shown in FIGS. 1 and 2, particularly directed towards showing the forming of the sheet material on a rotating cylindrical form.

Reference is now made to FIGS. 1-7 which illustrate a machine for the fabrication of my invention which has demonstrated particularly advantageous results.

The apparatus or machine 10 may be separated into five principal components, generally shown by the dashed lines, and indicated by the region designations 10-1, 10-2, 10-3, 10-4, and 10-5. The present invention is particularly concerned with the portion of the machine designated 10-1. It is this portion of the machine which receives the liquid latex and deposits same on the surface of a rotating cylinder 14. The liquid latex is then coagulated and removed from the forming surface as a sheet 20. The detailed explanation of this principal portion of the apparatus will subsequently follow.

Consideration will now be directed to the sequential operations performed by apparatus 10 after the sheet 20 leaves the formation section 10-1. The sheet then progresses to washing section 10-2 where a plurality of water jets 22, 24 and 26 wash off any coagulating liquid or other chemicals still remaining on the sheet. Sheet 20 then progresses to a drying section 10-3 which includes a plurality of heated rollers, generally shown as 25, for suitably preparing the sheet before presentation to the laminating section 10-4. Laminating section 10-4 preferably includes means for simultaneously laminating thin stretch fabric outer layers to both sides of the sheet material 20. These stretch fabric layers 31, 33, are provided by rolls, 30, 32 respectively. Sheet material 20 passes through an adhesive applying means 35 whch applies an appropriate adhesive (such as a tacky latex) to both sides of the material. The stretch fabric layers are fed along pin and tenter frames 31-1, 33-1 to pressure rollers 36, which surface-bond the outer fabric layers to the inner layer 20, forming a trilaminate 50. Trilaminate 50 then progreses through the blanket belt portion 38 of the laminating section, onto conveyor means 40, to the curing or vulcanizing oven 45.

The drive for the various sections 10-1, 10-2, 10-3, 10-4, are advanageously fed off a common motor 52. It should naturally be understood that the individual sections of the apparatus may be driven by individual drive means. However, the utilization of a common motor 52 assists in providing appropriate synchronization of the various sections. Motor 52 has an output indicated as 54. Output 54 drives gear box 56 of the section 10-1. Gear box 56 has an output gear 58 that is connected via chain drive 60 to gear member 62 mounted at the center of the cylinder 14 to effect rotation thereof.

The opposite end of the motor output 54 is shown connected to successively placed gear boxes 64, 66, 68, 70, 72, 74 and 76. Gear box 64 is interconnected via chain drive 78 to the gear member 80. This causes translation of the conveyor belt 82, serving to move sheet material 20 through the washing section 10-2. The drying section 10-3 is driven by the variable speed drive box 66. The output gear 84 of this drive box is connected via a chain drive 85 to a multiple gear member 87. Multiple gear member 87 includes a first gear which engages endless drive belt 95. The drive belt 95 is successively connected to the axial gears on each of the drive rolls 25 for rotating same in tandem. Another gear member of the multiple gear 87 is connected to a gear 92, which drives the conveyor belt 94, for moving the sheet material 20 into the laminating section 10-4.

The laminating section is in turn driven by the interconnected gear boxes 68, 70, 72, 74 and 76. The output of gear box 68 drives the roll 30, for feeding the fabric 31 which is to be applied to one of the surfaces of the sheet material 20. The output of gear box 76 similarly drives the other roll 32 of fabric 33 which is to be applied to the other surface of the sheet material 20. The output of gear box 72 drives the adhesive application means 35. Adhesive application means 35 includes a first adhesive applicator 35-1 for applying a desired amount of adhesive to one surface of the sheet 20, and a second adhesive applicator 35-2 for applying adhesive to the other surface of the sheet material 20. The sheet material 20 then progresses upward to the laminating section 34, where pressure rollers 36, apply the desired pressure for appropriately surface bonding the outer-fabric layers 31-33 to the inner sheet material 20. The laminate 50 now moves to the blanket belt section 38, This section is driven by the output gear box 70 via the belt member 91.

It should be understood, however, that section 10-4 is only one of numerous types of laminating arrangements which may be practiced in conjunction with the novel manufactured article of my invention. In those instances where the sheet material is required without any outer fabric layers, the laminating section 10-4 may be dispensed with. Also, wherein it is desired to laminate fabric to only one side of the sheet material, appropriate laminating machines well-known in the textile art may be employed. A pair of such machines may also be employed to successively apply first and second outer fabric layers, in place of the above discussed simultaneous arrangement.

The laminated sheet material 50, then progresses via conveyor 40 to the curing or vulcanizing section 10-5, which includes an appropriate heated chamber 45, of the type well-known in the latex treatment art. It should naturally be understood that, when other types of coagulable liquids are used which do not require the application of such heat for curing, the section 10-5 of the apparatus may be omitted, (e.g. pre-cured liquid latex).

Reference is now made more specifically to the portion of the apparatus designated 10-1 where the sheet material 20 is formed from the deposited liquid latex. This portion of the apparatus includes a forming means 14, shown as a rotatable cylinder. Cylinder 14 may be constructed of steel, and is preferably chrome plated. The face of the cylinder provides a forming surface 100 having a plurality of spaced projections 108. The spaces between the projections define open faced locations, such as 102 and 103, for the deposited latex layer (see FIG. 6). The projections include upstanding wall sections 107 terminating at top surfaces 110. These top surfaces may, therefore, be considered as collectively defining the outer surface of the forming means 14. It should be noted at this point that some of the open faced locations, such as 103, are of a significantly lesser depth than others such as 102. (The depth of locations 102 and 103 may for example be in the order of 0.030 and 0.020 inches, respectively.) This relates to the particular configuration of the forming surface 100 and will be subsequently discussed in greater detail in conjunction with FIG. 10–12. It should, however, be recognized that the lesser depth location 103 will naturally have a lesser thickness of liquid latex deposited thereon.

In the particular embodiment shown, the latex liquid is heat sensitive. The forming cylinder 14 is hollow and an appropriate heat source is internally applied for heating the forming surface 100. The heat source may be provided by steam supplied for inlet 111 (FIG. 3) and directed to the circumferential region of the cylinder by conduit member 112. (FIG. 4). The steam may typically be at an appropriate temperature to maintain the outer forming surface 100 of the cylinder at approximately 180°–200° F. This will serve to rapidly progress the coagulation of the liquid latex into a sheet from the time it is deposited on the forming means 14 to the time that it is stripped off.

Figure 9:
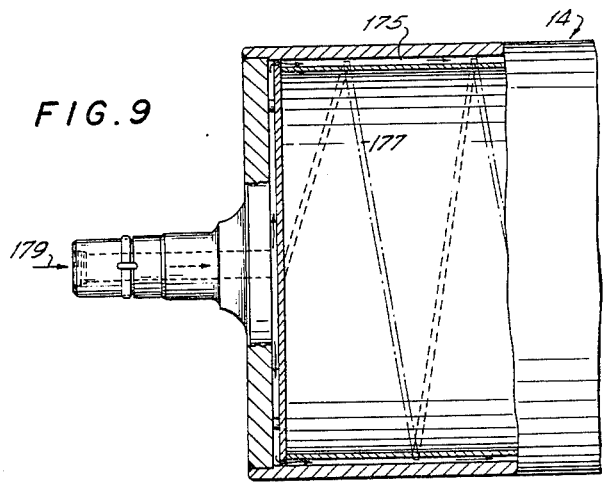
FIG. 9 is a cross-sectional view showing an alternative drum configuration, specifically directed to a modified arrangement for heating the drum surface and accelerating the coagulation of the deposited liquid, as well as the forming of the sheeting.

FIG. 9 shows an alternative arrangement for heating the surface of the cylinder in order to progress the coagulation of the deposited latex liquid into a sheet. The cylinder includes an internal circumferential pocket 175 and baffles 177. The input steam at 179 is direction to the circumferential region of the cylinder 14 and thereby heats the forming surface 100.

The depositing means, generally shown at 120, includes an inlet tube 122 (for example ) for continuously supplying liquid latex at a predetermined rate. Depositing 120 is in the form of a trough having transverse end members 124, 126, and forward and rear support members 128, 130 respectively. A spreading means in the form of a flexible blade 132 is appropriately connected to support 128, as by bolt means 129. The rear end of the depositing trough is defined by another flexible blade member 140. This blade is similarly secured to support member 130 by bolts means 143. The support members 128, 130 are, in turn, secured to angle members 144, 145, for mounting the depositing means 120 in proper position with respect to the moving cylindrical surface 100. The arcuate space between blades 132, 140, adjacent the cylinder, forms a movable feeding mouth for the latex bearing trough.

Figure 8:
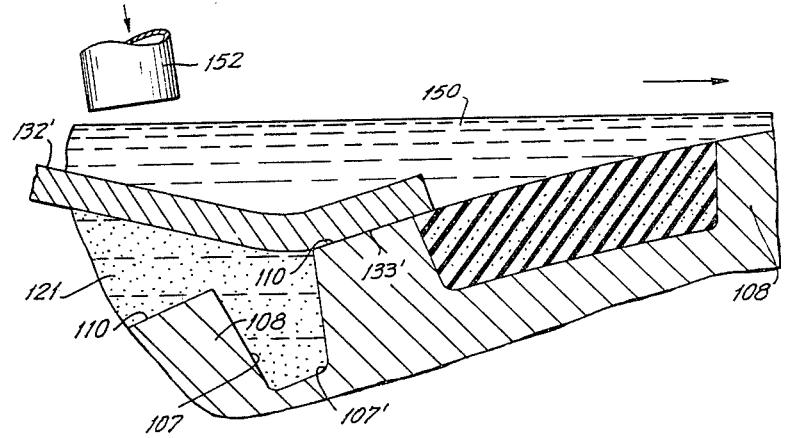
FIG. 8 is a view corresponding to FIG. 6, but shows a modified arrangement between the edge region of the flexible spreading blade and the forming surface.

The edge region 133 of the flexible blade is in immediate contact with the liquid latex as it emerges from under the depositing means 120. Blade member 132 must be of sufficient resiliency to make continuous contact with the successively presented tips 110 of the projections 108— it being recognized that due to manufacturing tolerances and wear the location of these top surfaces, may deviate somewhat for an exact cylinder. The blade member 132 must also have sufficient rigidity to span over the wider locations 103, and withstand the tendency of the liquid flowing thereunder from lifting the blade out of contact with the outer surface of the cylinder. Hence, the selection of the proper blade material is dependent upon such factors as the viscosity of the latex liquid, the configuration of the forming surface, and the rotational speed of the cylinder. In the embodiment shown in FIGS 1–7, I have obtained particularly favorable results using a spreading blade constructed of 0.006 inch thick blued, spring steel. The contact of the spreading blade 132 along the tops 110 of the projections is shown in FIG. 6 as a line-to-surface contact at blade edge region 133. It should be understood that as wear progresses this edge region may deviate somewhat from an exact line-to-surface contact, and may in practice eventually provide a blade surface of small dimensional extent against the projection top surfaces. Alternatively, it is proposed that under certain conditions of operation the spreading blade member may take the form shown by 132' of FIG. 8, where a blade spreading surface 133' is shown in contact with the top surface 110 of the projection.

The blade members 132, 140 define the boundaries of the trough's bottom opening. Since this opening is in juxtaposition to the forming surface 100, the forming surface serves as a relatively movable mouth for the latex reservoir 121. As the cylinder rotates in the direction indicated by the arrow , a depth of latex is drawn out of the reservoir 121, completely filling the open faced locations 102, 103 of the forming surface. As the forming surface moves out from under the reservoir's mouth the back edge region 133 wipes the projection tops 110. This wiping insures that the open faced locations 102, 103 are substantially filled with the liquid latex, and also serves to control the depth of liquid latex. The latex thickness is defined by the distance between the cylinder's outer surface (described by the projection tops 112) and the base means 104, 106 (see FIG. 6).

In summary, the blade member 132 serves as a spreading means, which is predeterminedly positioned with respect to the forming surface 100 to control the deposit liquid latex out of the reservoir, and thereby provide a desired depth of the liquid latex on the forming surfacce. My use of the term "predetermined depth" is herein intended to define the depth of material between the base means 104, 106 of the forming surface, and the outer liquid layer established by the location of the blade edge region 133. That term is intended to include a variation in such depth at different regions o f the forming surface.

It has been found that the deposited latex tends to flow over the projection tops 110 during this spreading operation. Hence, instead of having a clean hole at each of the projection locations, a thin film would be formed over the projection tops. Accordingly, means are provided to treat the surface of the latex liquid deposition as it emerges from under the blade member 132, to inhibit the tendency of the liquid latex to film over the projection tops and thereby provide through-openings at the projection locations. I have found that this may be preferably accomplished by immediately introducing a surface coagulant to the emerging liquid latex layer. Especially advantageous results have been obtained by using an active coagulating gelling liquid, such as an aqeuous solution of calcium chloride or calcium nitrate, of appropriate concentration (e.g. approximately 10–15%). Alternatively a weak acid, such as acetic may be used.

In accordance with the embodiment shown in FIGS. 1–7 the surface coagulant is provided by a pool 150 of the coagulating liquid. The pool 150 is maintained by locating the depositing means 120 behind the top-center location (FIG. 5) of the rotating cylinder. The blade member 132 provides a valley along an intermediate region of its outer surface, with the liquid coagulant pool being provided within the volume defined by this valley. As the cylinder rotates, the coagulant of pool 150 is applied to the blade edge region 133 and the just emerging latex layer. It has been demonstrated that this serves to sufficiently inhibit formation of a coagulated film layer over the projection tops 110 to provide clean openings at each of the projection locations.

The liquid coagulant is continuously fed into the pool 150, for example by an input tube 152. Excess flooding of the coagulant along the edges of the cylinder may be prevented by a pair of take-up suction tubes 153. An alternative arrangement for feeding the liquid coagulant into the pool 150 is shown in FIG. 15, where a trough 161 is shown. The trough has a narrow slot opening 162 for maintaining the desired level of liquid in the surface coagulant pool Suction tubes (not shown) may also be located at the edges of the cylinder.

It has also been found that as the latex emerges from under the blade edge region 133 there is a tendency of some latex coagulum to form along the blade edge region. A build-up of this coagulum will have a deleterious effect on the formation of acceptable foraminous sheet material. Hence, means are provided for continuously cleaning the blade edge region and preventing this build-up. I have determined that this function is preferably served by the continuous application of the liquid coagulant from pool 150 over the blade edge region.

Hence, the provision of the liquid coagulant pool 150 simultaneously and efficiently serves the two important functions of inhibiting the establishment of a coagulated film over the projection tops and cleaning any latex coagulum off the blade edge region.

The predetermined thickness of latex liquid, emerging from the depositing means 120 must then be maintained on the former surface 100 a sufficient interval of time to permit it to be gelled and stripped off as a self-sustaining sheet 20. In order to accelerate the manufacturing rate, the latex liquid includes heat-sensitizers to accelerate its coagulation. It should, however, be understood that the utilization of a heat-sensitive latex is not an absolute requirement, but only a practical expedient, with non-heating sensitive coagulable liquids being usable as long as the forming surface is of a sufficient length, or its speed sufficiently slow, to provide sufficient time for coagulation before stripping of the sheet material. The stripping of the sheet material is facilitated by a rubber idler roller 170 and high pressure waer jets 172. The water jets additionally serve to wash off any coagulating material that may remain on the cylinder, and thereby prepare it for the next deposit of latex liquid.

The water emerging from jets 172 is collected in a pool 180, having a discharge outlet 182. As the cylinder 14 continues its rotation it is then presented to an air jet 174 which suitably dries the cylinder's surface 100 before the next application of latex. Preferably a cleaning brush 184 is also provided. Brush 184 is on arm 185, which is pivotly mounted at 186. The cleaning brush may be used during the transient start-up time of the machine, until the sheet material 20 beings to peel off the cylinder in its normal easy manner. The cleaning brush 184 may then move out of engagement with the cylinder as shown by the dotted condition of FIG. 4.

The stripping of the sheet material 20 off the circumference of the cylinder 14 is further facilitated by the sloped sides 107 of the projections. The sloped sidewalls are analogous to the draft provided in a casting operation, to facilitate the removal of the cast product from its mold. A fillet 107' is also provided where the sidewalls 107 of the projection meet the bottoms 104, 106. Fillets 107', in addition to facilitating the stripping of the sheet 20, also serve to provide an advantageous end-product by the elimination of sharp edges in the sheet material which would tend to cause a weakened region about the holes.

The draft along the side walls 107 of the projections 108 may be achieved in an inexpensive manner by fabricating the forming surface 100 with standard engraving tools. Thus, the cylinder 14 may be considered as having an engraved roll coating 100 formed by fabrication techniques of the type well-known for the manufacture of pressure embossing rolls.

In accordance with another advantageous practical aspect of the apparatus shown in FIGS. 1 through 7, the edge region 133 of the spreading and wiping blade 132 is canted relative to the placement of the projections 108 on the forming surface. This is best seen in FIGS. 1 and 7 where the edge 133 of the blade 132 is shown in simplified form by the dotted line 133-1 and the line joining the centers of adjacent rows of projection is shown as 108-1. With the pattern shown in FIGS. 1 through 7, an angle of about 15° between axes 108-1 and 133-1 has demonstrated particularly favorable results.

The projections 108 of the forming surface shown in FIGS. 1 through 7 are in 60° relationship, as shown by the lines 190, forming equilateral triangles. This provides a preferable commercial product simulating a lace-like product. With such a configuration it has been determined that maximum openness with maximum strength of material is obtained by having a hexagonal hole shape. Hence, the projections 108 are of such a cross-section, with their corners being rounded so as to again prevent the formation of any sharp edges in the hole. The petal portions of this configuration are advantageously formed at the location 103 of the forming surface. Alternatively, the petals may be formed by a suitable spacing of the holes.

Although I have found that the use of a liquid surface coagulant works particularly well, it is suggested that other active surface coagulants may be used. FIG. 16 shows one possible alternative where a gaseous or nebulized coagulant 160 is provided within a shroud member 164, such that this surface coagulant, fed by inlet means 164, is effectively applied to the edge region 133 of blade 132, and the immediately emerging liquid latex. The gas 160 may for example be carbon dioxide or any other suitable gaseous or nebulized substance for rapidly lowering the pH of the latex surface, so as to effect a rapid surface gelling. As another alternative it is suggested that heat may be applied to this region, as by an infra-red source (not shown).

Reference is now made to the FIGS. 10–12, which show a portion of the foraminous sheet metal formed on the apparatus of FIGS. 1–7. The sheet material 20 includes a hole 195 at each of the locations corresponding to the projection 108. The hole partakes in the projection formation, and hence has a smaller upper cross section, than lower cross section. The transition regions 109 between the holes are preferably of a cross sectional configuration to provide maximum strength, porosity of the material, and wearing comfort when laminated and made into a garment.

In accordance with one particularly advantageous aspect of a form of my invention, the foraminous sheet material has a lesser thickness at the relatively closed regions 200 of the sheet material which includes the petal portions of the lace-like configuration.

Should both the relatively closed and relatively open regions be of the same thickness (as in my prior art spray produced material), there will be more rubber per unit area in the relatively closed regions than in therelatively open-mesh like regions. As a result, the closed regions will not stretch as much as the open regions. Hence, the relatively open regions may be subjected to undue stresses, thereby tending to reduce the useful life of the products formed therefrom. This is particularly true when the sheet material is to be used in conjunction with body constricting garments, such as girdles, where certain portions of the garment may be subjected to substantial repeated stresses. Accordingly, by reducing the cross-sectional thickness of the pedals, I tend to provide a more uniform stretch throughout the sub-areas of the sheet material. For example, the transition regions 197 between the openings 195 may have a thickness in the order of 0.025 inch., and the thickness of the solid petal regions 200 may be in the order of 0.015 inch.

As another alternative, the forming surface may be suitably modified to provide the material for a girdle having a reinforced thicker panel section as compared to the new portions intended for other regions of the garment. Such a girdle may be made without it being necessary to sew such panel sections to the main body section, as is the common practice since, to make certain areas of the foraminous material thicker than other areas, requires only that forming surface be of a greater depth at such areas. Consequently it is possible to provide a localized thicker control panel, by making the panel sections deeper than the other parts of the foraminous material.

FIG. 13 shows a portion of the foraminous inner layer surrounding one of the holes 195, when subjected to a considerable stretching force. It should be noted that when the hole 195 enlarges, and the widths of the transition regions 197 diminish, the provision of rounded corners 195-1 serve to eliminate weak points, that would tend to cause rupture of the sheet.

Reference is now made to FIG. 14 which shows the laminated material 50, consisting of the intermediate foraminous sheet material 20, and thin stretch fabric outer layers 31, 32 bonded thereto. The surface 50-1 of the laminated material will tend to have a more pronounced presentation of the lace-like configuration than surface 50-2. Thus, when the laminated material is used for the manufacturer of a garment surface 50-1 may be placed on the outside of the garment.

Figure 17:
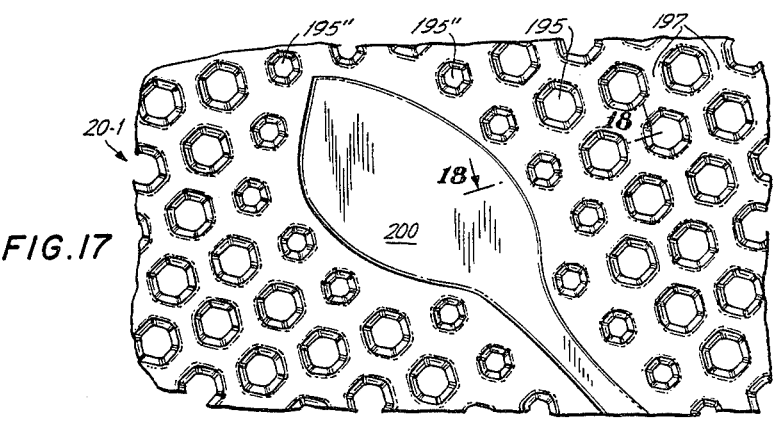
FIG. 17 represents a modified product readily capable of production in accordance with my invention, in which lesser cross-sectional openings border certain regions of the lace-like configuration.
Figure 18:
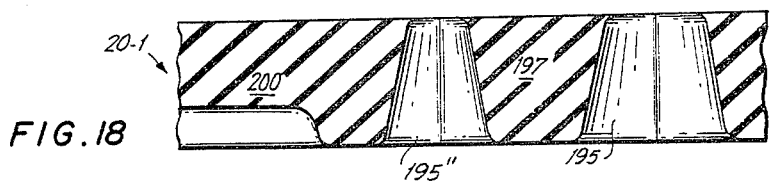
FIG. 18 is a cross-sectional view of FIG. 17 along the line 18—18 thereof.

Reference is now made to FIGS. 17 and 18 which show still another modification of the foraminous sheet material for equalizing the stresses over its various sub-areas. The material 20-1 corresponds to previously discussed sheet 20 except that the holes 195″ bordering the relatively closed regions 200 of the petals may be reduced cross-section. Since substantial stresses would occur in those regions of the sheet material wherein the relatively open mesh-like regions meet the more stretch resistant closed regions, the provision of such reduced cross-section holes 195″ further serves to reduce this stretch gradient and prevent stress damage.

Referring to FIG. 19, still another modification is shown for providing more uniform stretch over the sub-areas of the sheet material 20-2. Rather than having only two thicknesses of material, as shown in FIG. 10, a gradual change is provided between the relatively closed region 200 at the left and the relatively open region at the right. Thus, one or more intermediate transition regions may be provided in which the material is of an intermediate thickness, between the minimum thickness of the relatively closed region and the maximum thickness of the open mesh-like region. This intermediate transitional region includes holes 195‴ which may be of the same cross-sectional area as holes 195, or may be of reduced cross-sectional area in accordance with the technique of FIGS. 17 and 18.

FIG. 20 relates to a modified apparatus for forming foraminous sheet material 20-3, acceptable for some purpose. This material includes a thin film 210 which overlies at least some of the hole locations 195. This film may be the result of a transient insufficiency in the operation of the surface coagulant. Thin film 210 may be ruptured by the high pressure application of a liquid 212, such as water supplied by jet 214. Where it is anticipated that some slight amount of filming may occur, jet 214 may be provided by one or more of the w ashing jets 22, 24 or 26 (FIG. 2).

Figure 21:
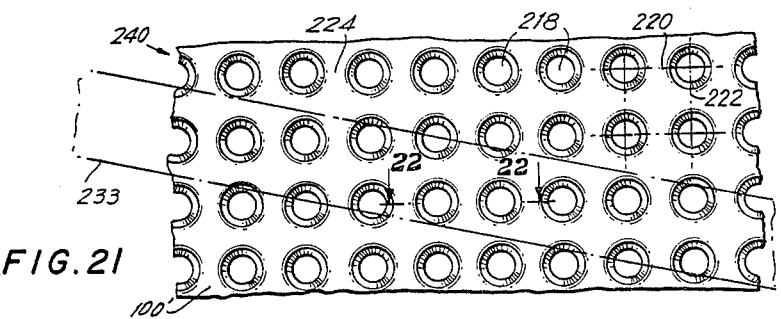
FIG. 21 is a top view of still another configuration of foraminous sheet material in accordance with the present invention, in which the holes are of uniform size and are disposed in a uniform pattern.
Figure 22:
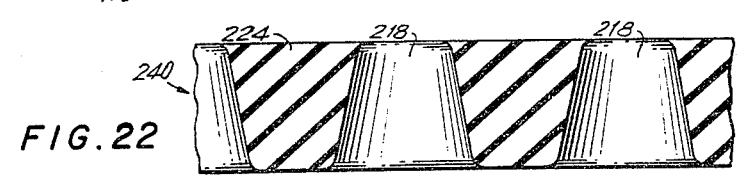
FIG. 22 is a cross-sectional view of FIG. 21, as shown by the arrows 22—22 thereof.

Reference is there made to FIG. 21 which shows another type of forming surface 100′ which may be provided about the circumference of the forming cylinder 14. This forming surface includes a plurality of regularly spaced projections 218. These projections are circular in cross-section and disposed in a 90° pattern as shown by the lines 220, 222. Forming surfaces 100′ includes transition regions 224 of uniform depths. The sheet material 240 of FIG. 22 which is produced on such a form demonstrates improved strength, and may advantageously be used where a lace-like configuration is not commercially dictated.

Figure 23:
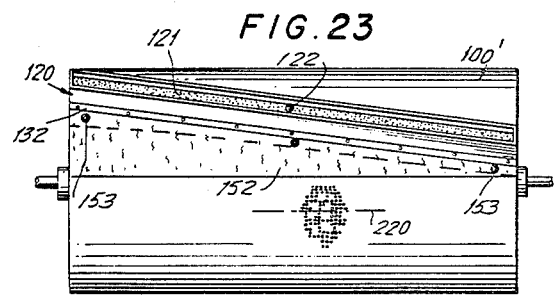
FIG. 23 shows in simplified form, a cylinder which may be used to fabricate the sheet material of FIGS. 21 and 22.

Line 223 indicates in phantom the relationship of the spreading means blade, and the projections of the forming surface to prevent abrupt jumping of the wiping blade from row to row. This canted relationship is preferably provided by an angular off-set between the rows of projection 218, and the axis of the cylinder, similar to that shown in FIG. 1. Alternatively, where the rows of the projections, as shown by the line 220, are parallel to the axis of the cylinder the depositing means 120 may be canted to give the angular off-set, as shown in FIG. 23.

Reference is now made to FIGS. 24 through 29 which compare micro-photographs of products which may typically be made in accordance with the present invention, and the prior art spray deposition process.

Figure 24:
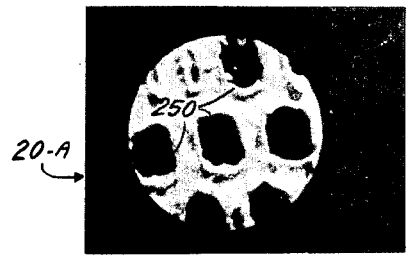
FIG. 24 is a micro-photograph of one of the surfaces typically present in foraminous sheet material formed in accordance with the prior art spray appartus.

FIG. 24 shows the prior-art material 20 -A which is formed by the spraying of latex droplets on a lace belt. The surface shown in FIG. 24 is the surface formed against the belt, and thereafter stripped off the lace belt.

It should be noted that roughened edges or surface fissures 250 exist about each of the holes, and other regions of the material. This should now be contrasted to FIG. 25 which showed the much smoother surface of the material 20 adjacent the form of my invention.

Since the deterioration of the latex material initiates as a surface effect the minimization of surface provides a longer lasting product.

Figure 25:
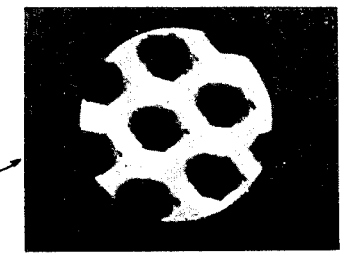
FIG. 25 is a similar micro-photograph of the corresponding surface produced in foraminous sheet material of the present invention.
Figure 26:
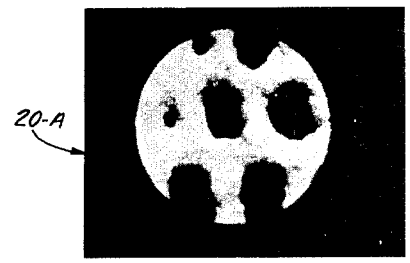
FIGS. 26 and 27 show the opposite surfaces of the materials in FIGS. 24 and 25, respectively.
Figure 27:
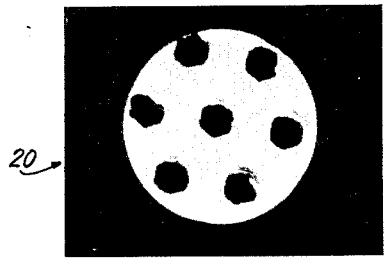
Figure 28:
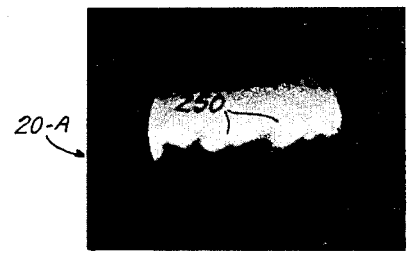
FIGS. 28 and 29 are cross-sectional views of the materials shown in FIGS. 24 and 27.
Figure 29:
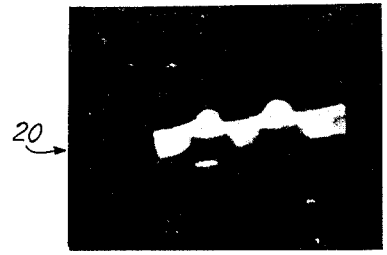

FIGS. 26 and 27 show the opposite surfaces of the FIGS. 24 and 25 materials, respectively. Again, the present product of FIG. 27 shows a very smooth surface, free of surface fissures. FIGS. 28 and 29 show cross sectional views of these materials.

FIG. 30 represents another modification of my invention where the forming surface is provided on an endless conveyor belt 300 and either (or both) the belt or depositing means is movable. Endless conveyor belt 300 may be constructed of a suitable plastic material having a forming surface. The forming surface may have the lace configuration of FIGS. 1–7, the uniform hole spacing of FIG. 21, or any other desired configuration. Conveyor belt 300 is driven by rollers 302, 304, 306 there being an upward relationship between the rollers 302, 304. The depositing means 320 substantially corresponds to depositing means 120 shown in the embodiment of FIGS. 1–7, and includes a liquid latex reservoir 321 in a trough-like enclosure. The endless conveyor belt serves as a moving feeding mouth for the trough. The liquid coagulant pool 350 corresponds to pool 150 of the previous embodiment. The conveyor belt may be of sufficient length intermediate the broken away regions to obtain substantial coagulation without heat sensitive latex . Alternatively a heat sensitive latex may be used and an appropriate heating means may be applied to the endless conveyor belt .

Conveyor belt then passes through washing station 360 where one or more jets of water are applied thereto, and then subsequently to a drying station 370 where air is directed against the sheet material. The sheet material may then be stripped off the forming conveyor. Alternatively a fabric laminate may first be applied to one surface. This is shown by the application of an adhesive latex at 371 and the bonding thereto of a thin fabric layer 380 from roller 382. The layer passes between roller 306 and 384 to apply appropriate laminating pressure to effect a good surface bond. Where a trilamiate material is required, a layer of adhesive may be then applied to the opposite side of the sheet at adhesive station 390. The additional layer of fabric 392 from roll 394 is then laminated onto the material as it passes intermediated pressure rollers 396, 398. Hence the sheet material 400 emerging therefrom will be a trilaminate having an inner layer formed in accordance with my invention, and two outer fabric layers.

Figure 31:
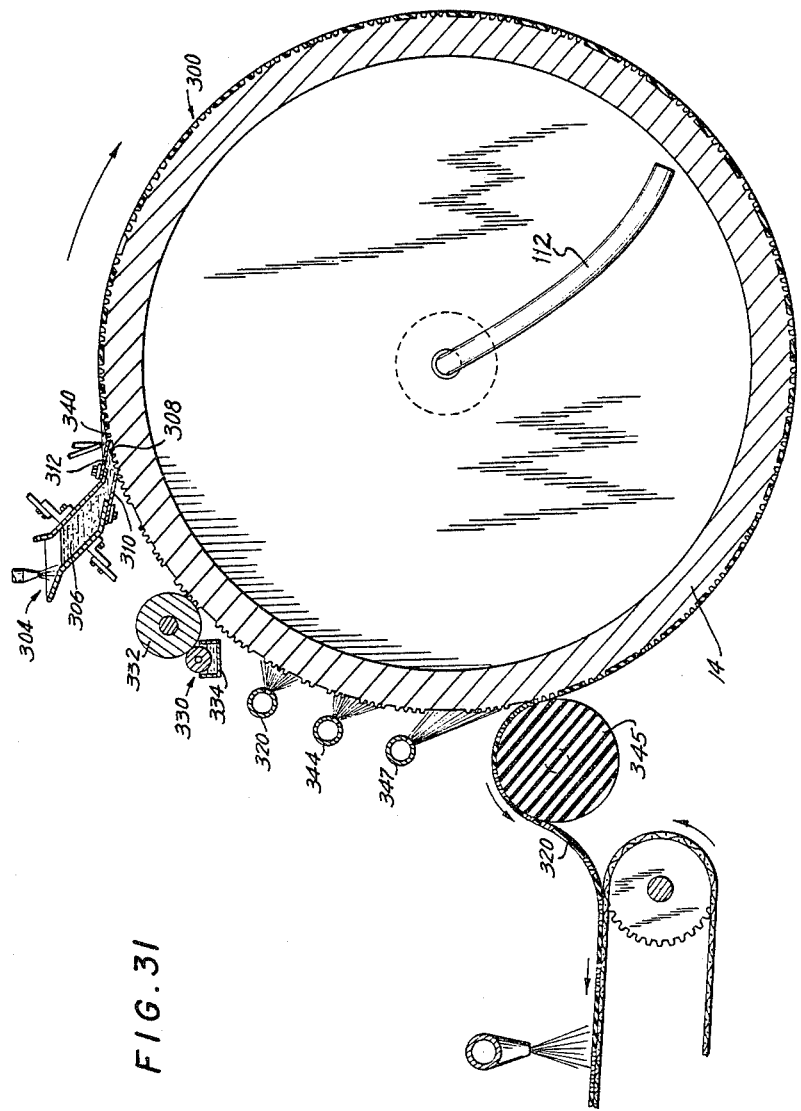
FIG 31 illustrates still another alternative apparatus embraced by my inventive concepts.

FIG. 31 shows, in simplified form, another modification of an apparatus in accordance with my invention, for forming thin foraminous sheet material. Apparatus 500 includes a cylinder which essentially corresponds to cylinder 14 of the embodiment shown in FIGS. 1–7 . This cylinder has a plurality of spaced projections in accordance with the desired configuration of the resultant foraminous sheet material. The depositing means 304 includes a trough-like reservoir which contains liquid latex 306. The feeding mouth 308 is positioned adjacent the cylinder's forming surface, and includes the blades 310, 312 to define an arcuate opening. The cylinder may also have at appropriate heat source means 112 to accelerate the gelation of the deposited liquid latex to sheet material.

Prior to the deposition of the liquid latex a coagulant means 320 coats the entire forming surface of the cylinder with a liquid coagulant. A surface treatment means 30 is immediately applied along the top surfaces of the forming projections, to prevent the subsequent formation of a coagulated film over such top surfaces. Such surface treatment means may be provided by a liquid solution of a neutralizer such a sodium hydroxide, or a silicone to prevent the filming over the projection top surfaces. The neutralizer may be applied by a rubber roller 332 withdrawing such liquid from a trough 334 containing a supply of the liquid. The depositing means 340 must include an appropriate cleaning arrangement to prevent the formation of a latex coagulum on the edge region of blade 312. This may be provided by appropriate heating of the blade, or the application of water or a mild soap solution 340 which will prevent exposure of the blade edge region to air. The sheet material then coagulates on the cylinder's surface, and is removed at the location which includes stripping roller 345 and water jets 347. The cylinder surface is then dried by an air source 344, and is then presented to coagulant supply source 320 to initiate another cycle of operation.

As previously noted, I have obtained particularly favorable results using a heat sensitive latex as my gelling or coagulable liquid. This heat sensitive latex is appropriately compounded in accordance with the desired characteristics of the end product and the machine parameters.

The following compound has provided desired results when used where "Parts by Weight 38 means for every 100 parts of dry rubber latex as a basic unit, the succeeding amounts of additional materials are added. Thus, in each example, the base unit is Natural Rubber Latex=100

| Example 1 | Parts by Weight |
|---|---|
| Natural Rubber Latex | 100.0 |
| Stabilizers | .75 |
| Sulfur | 1.0 |
| Accelerators | 1.5 |
| Activator | 1.0 |
| Antioxidant | 1.0 |
| Wax Emulsion (ultra-violet protection) | 1.0 |
| Titanium Dioxide (whitener) | 10.0 |
| Amonium Nitrate (heat sensitizer) | 1.0 |

This compound has a viscosity in the range of 1500–1800 centipoises (at room temperature of 72° F.) Other compounds having a viscosity of up to 2400 centipoises have also demonstrated favorable performance. It should be understood that the variation in viscosities would be dependent on such other parameters as the trough opening and the relative motion between the trough and forming surface.

The following compounds, noted in my aforementioned patent application Ser. No. 704,783 have also provided acceptable results:

| Example 2 | Parts by Weight |
|---|---|
| Natural Rubber Latex | 100.0 |
| Sulfur | 1.0 |
| Titanium Dioxide | 10.0 |
| Zinc Oxide | 1.0 |
| Stabilizer | .75 |

| Example 2 | Parts by Weight |
|---|---|
| Accelerator | 1.25 |
| Antioxidant | 1.0 |
| Heat Sensitizer | 1.0 |

| Example 3 | Parts by Weight |
|---|---|
| Natural Rubber Latex | 100.0 |
| Alkali | .8 |
| Potassium Oleate | .5 |
| Sulfur | 1.0 |
| Zinc Oxide | 1.0 |
| Stabilizer | .75 |
| Accelerator | 1.25 |
| Antioxidant | 1.0 |
| Heat Sensitizer | 1.0 |

| Example 4 | Parts by Weight |
|---|---|
| Natural Rubber Latex | |
| Alkali | .8 |
| Sulfur | 1.0 |
| Zinc Oxide | 1.0 |
| Stabilizer | .75 |
| Accelerator | 1.25 |
| Antioxidant | 1.0 |
| Ammonium Oleate | .5 |

It should be noted, in Example 4, that the heat sensitizing agent may be omitted from the compound if ammonium oleate is added to such compound because, it has been found, such ammonium oleate makes the compound sufficiently heat sensitive to be used in the method of this invention.

The previous examples are compounded by mixing the various materials, the ingredients being added to the latex as indicated above, the liquids as solutions and the solids as dispersions.

Among the heat sensitizing agents which have been found particularly effective are ammonium nitrate, sodium fluosilicate, amonicial zinc acetate, diphenylguanidine, gantrez, triacetin, nitromethane, and nitropropane.

It is therefore seen that the present invention relates to an improved foraminous sheet material formed from a coagulable liquid, such as a latex.

I claim:

1. A foraminous sheet of elastomeric material having a lace-like configuration including portions thereof having a substantial plurality of completely perforated openings per unit area, said configuration being repeated over the extent of the sheet and formed of relatively open mesh regions and relatively closed solid petal regions, said open mesh regions having a substantially greater area of such openings per unit surface area than in said closed petal regions, said elastomeric sheet characterized as being of non-uniform thickness over the extent of the sheet, with said open mesh regions having a first thickness of elastomeric material and at least some of said closed petal regions having a second thickness of elastomeric material, said second thickness of a predetermined lesser amount than said first thickness such that said second thickness closed petal regions have a greater surface of elastomeric material per unit area than in said open mesh regions without having a correspondingly greater amount of elastomeric material per unit area, the second thickness closed petal regions of the sheet material being preselectively distributed over the surface of the sheet to provide increased uniformity in distribution of stresses in the sheet when subjected to stretching.

2. A sheet according to claim 1 wherein said second thickness is at least one-third less than said first thickness.

3. A sheet according to claim 1, further including at least one transition region between closed and open regions, said transition region having a thickness intermediate said first and second thicknesses.

4. A sheet according to claim 1, wherein at least some of the openings bordering said closed petal regions are of a reduced cross-section in relation to the openings within said open regions.

5. Sheet material according to claim 1, which is formed of a latex.

6. A sheet according to claim 5, further including at least one transition region between said closed and open regions, said transition region having a latex thickness intermediate said first and second thicknesses.

7. A sheet according to claim 5, wherein at least some of the openings bordering said closed petal regions are of a reduced cross-section in relation to the openings within said open regions.

* * * * *